US007883014B2

(12) United States Patent
Runbeck et al.

(10) Patent No.: US 7,883,014 B2
(45) Date of Patent: Feb. 8, 2011

(54) ACCEPTANCE TRAY FOR AN ELECTION BALLOT PRINTING SYSTEM

(76) Inventors: Robert Kevin Runbeck, 5262 E. Fanfol Dr., Paradise Valley, AZ (US) 85253; Valentino F. Guyett, 1830 Linwood Ave., SW., Olympia, WA (US) 98512; John W. Latsko, 1850 E. Laredo Pl., Chandler, AZ (US) 85225

( * ) Notice: Subject to any disclaimer, the term of this patent is extended or adjusted under 35 U.S.C. 154(b) by 417 days.

(21) Appl. No.: 12/055,293

(22) Filed: Mar. 25, 2008

(65) Prior Publication Data

US 2008/0237342 A1 Oct. 2, 2008

Related U.S. Application Data

(60) Provisional application No. 60/908,141, filed on Mar. 26, 2007.

(51) Int. Cl.
*G06K 17/00* (2006.01)

(52) U.S. Cl. ...................................................... 235/386

(58) Field of Classification Search ............. 235/51–57, 235/386

See application file for complete search history.

(56) References Cited

U.S. PATENT DOCUMENTS

| | | | | |
|---|---|---|---|---|
| 6,070,801 | A | 6/2000 | Watanabe et al. | |
| 6,095,420 | A | 8/2000 | Kawai et al. | |
| 6,257,531 | B1 | 7/2001 | Penner | |
| 6,283,590 | B1 * | 9/2001 | Peter | 347/102 |
| 6,343,742 | B2 | 2/2002 | Watanabe et al. | |
| 6,481,683 | B1 | 11/2002 | Stewart et al. | |
| 6,655,595 | B1 | 12/2003 | Longacre, Jr. et al. | |
| 6,728,015 | B2 | 4/2004 | Ohkawa et al. | |
| 6,837,468 | B1 | 1/2005 | Kantor et al. | |
| 7,076,086 | B2 * | 7/2006 | Miyake et al. | 382/112 |
| 7,080,779 | B2 * | 7/2006 | Cummings | 235/386 |
| 2006/0049252 | A1 | 3/2006 | Guyett et al. | |

FOREIGN PATENT DOCUMENTS

WO 02/052371 A2 7/2002

OTHER PUBLICATIONS

European Application No. 08744414.7 European Search Report dated Jul. 26, 2010.

* cited by examiner

*Primary Examiner*—Seung H Lee
(74) *Attorney, Agent, or Firm*—Schmeiser Olsen & Watts LLP

(57) ABSTRACT

An election ballot printing system includes a printer and electronic imaging device operatively coupled to a computer. The electronic imaging device images a ballot outputted by the printer in response to an indication provided by the computer. The electronic imaging device flows information corresponding to the ballot to the computer.

29 Claims, 15 Drawing Sheets

ACCEPTANCE TRAY FOR AN ELECTION BALLOT PRINTING SYSTEM

CROSS-REFERENCE TO RELATED APPLICATIONS

This patent application claims priority to U.S. Provisional Application No. 60/908,141 filed on Mar. 26, 2007, the content of which is incorporated herein by reference.

BACKGROUND OF THE INVENTION

1. Field of the Invention

This invention relates to generating ballots using a printer.

2. Description of the Related Art

It is generally not known before an election the number of people who will vote, as well as their identity. Hence, a large number of ballots are often printed before an election in the hope that there will be enough ballots for all of the voters. Providing enough ballots for all of the voters is difficult because the ballots are not all the same. For example, the ballots can be different for different political parties, such as Independent, Democrat and Republican. The ballots can be different for different geographical locations, such as different counties, cities and states. Further, it is often necessary to provide ballots in different languages (i.e. English and Spanish) because voters typically understand different languages. The ballots can even be different for different elections, such as state and national elections.

To better illustrate the problem, consider an election which has 10,000 registered voters. In this situation, it is typical to print and distribute about 50,000 ballots with the hope that the correct ballot will be available for each voter. For example, if one voter speaks Spanish and is a Republican, then he or she will need to be provided with a ballot written in Spanish that corresponds with a ballot for the Republican Party. Hence, the ballot must be the correct ballot for the person requesting it.

The ballots are distributed to different voting sites around the location that the election will take place. It can be appreciated that it is difficult and time consuming to print and distribute a large number of ballots, and it would be much easier to print a distribute a smaller number of them. Further, once the ballots are at the voting site, it is difficult and time consumer to find the correct ballot for the voter. Some voters may not be able to vote if the voting site runs out of the correct ballots, or if the correct ballot cannot be found.

Ballots that are printed for the election and not used are typically discarded after the election. Discarding unused ballots is wasteful and expensive, so it is desirable to reduce this occurrence.

BRIEF SUMMARY OF THE INVENTION

The invention employs an election ballot printing system which includes a printer and electronic imaging device operatively coupled to a computer. The electronic imaging device images a ballot outputted by the printer in response to an indication provided by the computer. The electronic imaging device receives information corresponding to the ballot outputted by the printer, and flows the information to the computer.

In some embodiments, the election ballot printing system includes a ballot support tray which receives the ballot outputted by the printer. The ballot support tray can include an acceptance tray housing and ballot support structure, wherein the acceptance tray is repeatably moveable along the ballot support structure. The ballot support structure can include an opening which faces a downwardly facing surface of a ballot carried by the ballot support structure.

The invention employs a method of providing a ballot, which includes providing an election ballot printing system having a computer operatively coupled to a printer and electronic imaging device. An indication is provided to the printer from the computer that it is desired to print the ballot. The ballot is imaged with the electronic imaging device in response to a control signal from the computer. Information provided by the electronic imaging device is stored by the computer, wherein the information corresponds with the ballot outputted by the printer.

Further features and advantages of the invention will be apparent to those skilled in the art from the following detailed description, taken together with the accompanying drawings.

DETAILED DESCRIPTION OF THE INVENTION

Figure 1A:
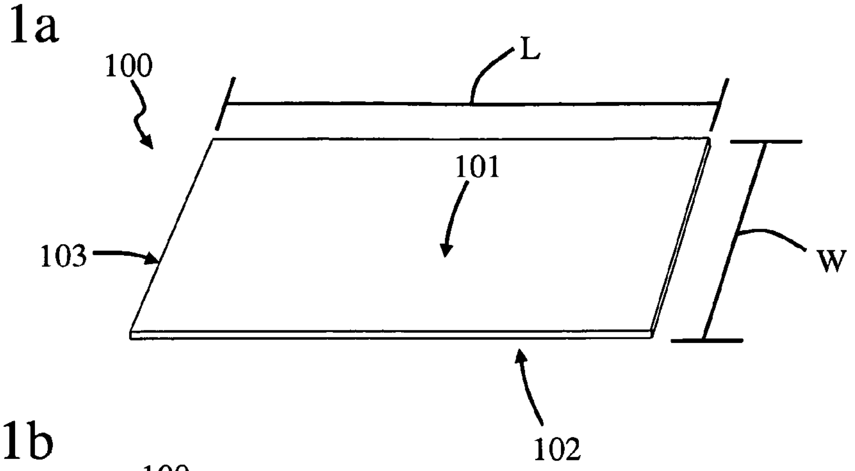
FIGS. 1*a*, 1*b* and 1*c* are perspective, front and back views, respectively, of an unprinted ballot, in accordance with the invention.
Figure 1B:
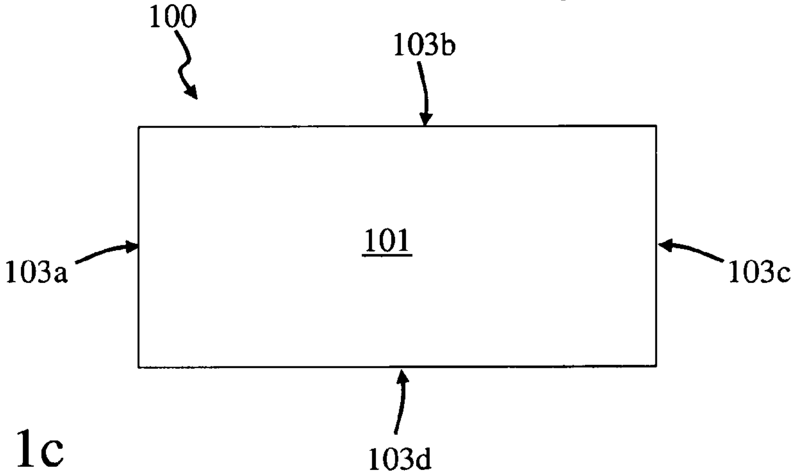
Figure 1C:
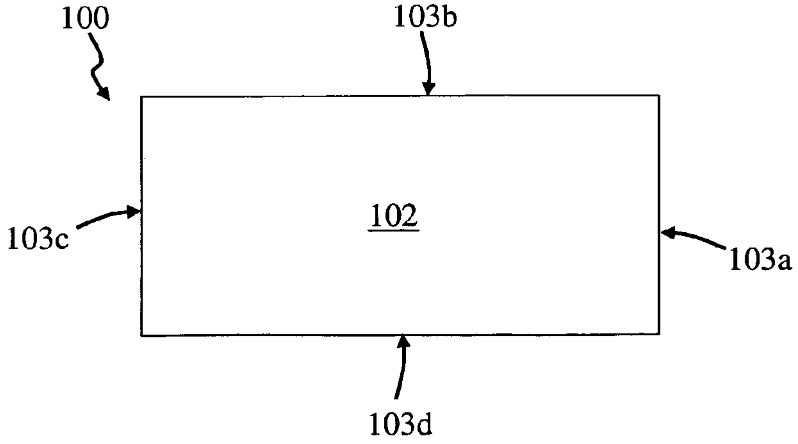

FIGS. 1*a*, 1*b* and 1*c* are perspective, front and back views, respectively, of an unprinted ballot 100. In this embodiment, unprinted ballot 100 has a predetermined rectangular shape having dimensions of length L and width W. The dimensions of unprinted ballot 100 depends on many different factors, such as the election it is to be used in. For example, some precincts may requires ballot 100 to have certain dimensions and other precincts may require ballot 100 to have different dimensions.

Unprinted ballot 100 includes opposed front and back surfaces 101 and 102, which are bounded by an outer edge 103 which extends around it. Outer edge 103 includes opposed edges 103*a* and 103*c*, as well as opposed edges 103*b* and 103*d*. Opposed edges 103*a* and 103*c* are parallel to each other and perpendicular to edges 103*b* and 103*d*. It should be noted that unprinted ballot 100 generally does not include indicia. Although, in some situations, unprinted ballot 100 can include indicia. However, it is desirable to print more indicia on front and/or back surfaces 101 and 102 so that unprinted ballot becomes a printed ballot, as will be discussed in more detail presently.

Figure 2A:
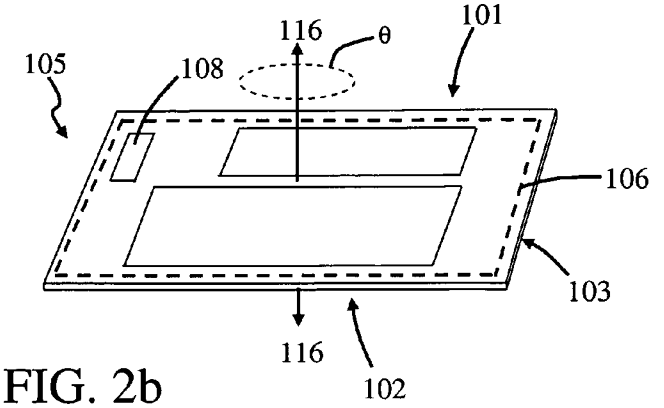
FIGS. 2*a*, 2*b* and 2*c* are perspective, front and back views, respectively, of a printed ballot, in accordance with the invention.
Figure 2B:
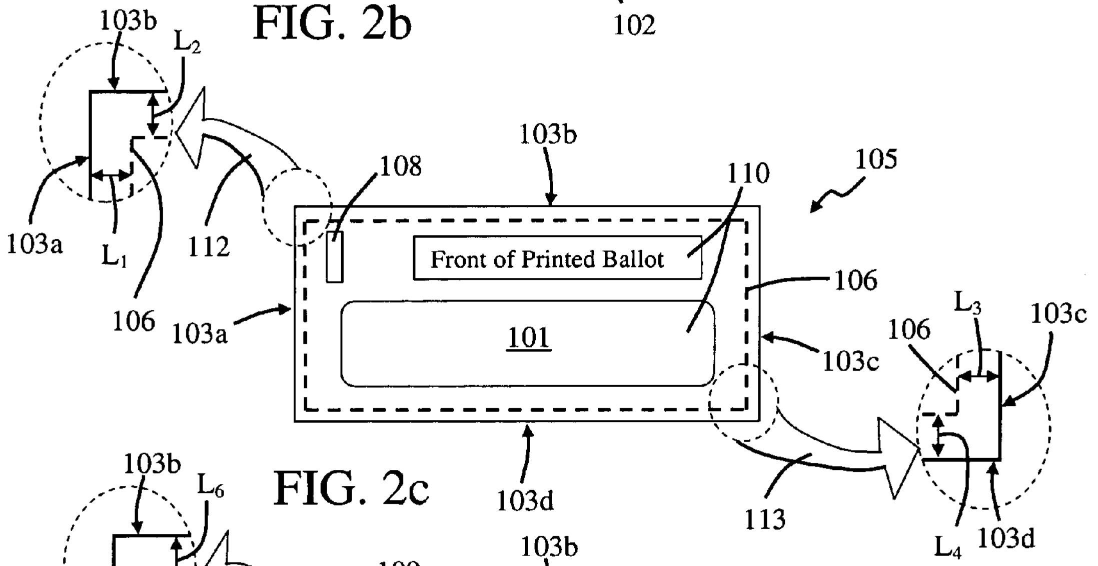
Figure 2C:
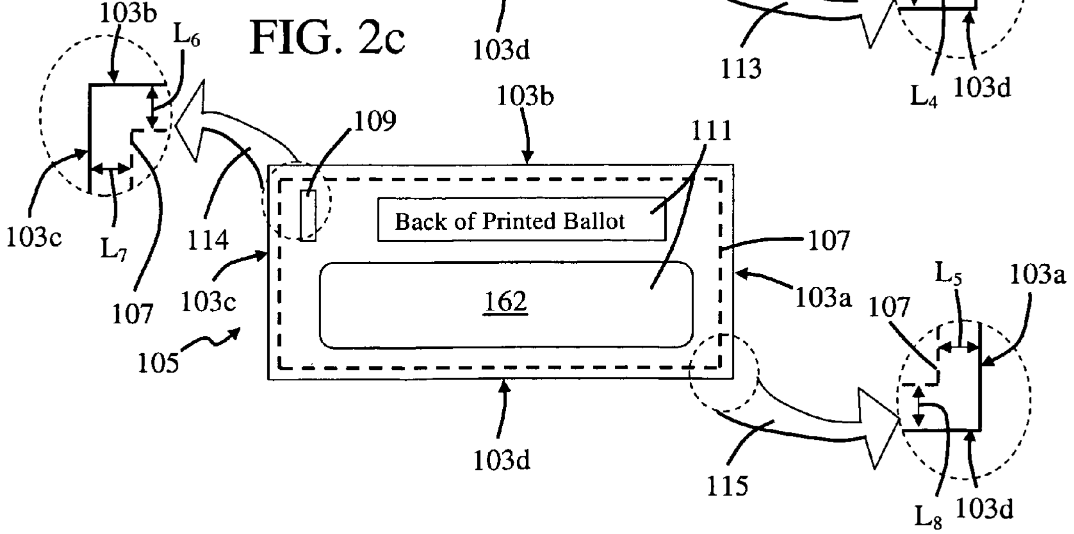

FIGS. 2*a*, 2*b* and 2*c* are perspective, front and back views, respectively, of a printed ballot 105. It should be noted that printed ballot 105 corresponds to unprinted ballot 100 after it has been generated by an election ballot printing system. The election ballot printing system generates the unprinted ballot by printing indicia on it. Several examples of election ballot printing systems are discussed in more detail below with FIG. 3*a*. Hence, printed ballot 105 can correspond to unprinted ballot 100 when indicia is formed on front and/or back surfaces 101 and 102.

In this embodiment, indicia 110 and 111 are printed on front and back surfaces 101 and 102, respectively. Indicia 110 and 111 can be of many different types, such as personal information and information corresponding to the particular election that printed ballot 105 is to be used for. There are several problems when printing indicia 110 and 111 on a ballot, such as ensuring that indicia 110 and 111 correspond with each other. For example, if indicia 110 includes the personal information of a voter in one city, indicia 111 should include information corresponding to the election in that city, and not another city. There are several ways to ensure that indicia 110 and 111 correspond with each other.

In this embodiment, barcodes 108 and 109 are printed on front and back surfaces 101 and 102, respectively. Barcodes 108 and 109 can correspond to many different types of information, such as that corresponding to indicia 110 and 111. Barcodes 108 and 109 are useful so that the information is machine readable and can be easily entered into a computer with a barcode reader. In accordance with the invention, barcode 108 corresponds to indicia 110 and barcode 109 corresponds to indicia 111. In this way, barcodes 108 and 109 can be read by a barcode reader to ensure that indicia 110 and 111 correspond with each other.

Barcodes 108 and 109 also make the generation and distribution of a ballot an easier task. Barcodes 108 and 109 can be read to make sure that the ballot is printed correctly for the person requesting it. Barcodes also make printed ballot 105 trackable so that its movement history can be documented. This provides the ability to generate and distribute ballots in a manner that preserves the integrity and accuracy of the election.

It should be noted that it is useful to print ballot 105 accurately so that it can be read with the barcode reader. Hence, it is desirable to print barcodes 108 and 109 so they can be read by the barcode reader with a reduced likelihood of errors. As will be discussed in more detail below, there are many different ways to ensure that printed ballot 105 is printed accurately enough to be read.

One way to ensure that printed ballot 105 is printed accurately enough to be read is to make sure that indicia 110 and 111 and barcodes 108 and 109 are aligned correctly when printed. It is desirable to print indicia 110 and 111 and barcodes 108 and 109 on ballot 105 within a predetermined position tolerance. This ensures that indicia 110 and 111 and barcodes 108 and 109 can be read accurately and that the printed ballots are printed consistently from one ballot to another. Hence, the skew and positioning of the indicia and barcodes on the ballot are often required to be within predetermined tolerances. To aid in meeting the predetermined tolerances, a borderline is positioned proximate to the outer periphery of the ballot and can be used to adjust the positioning and skew of the indicia and barcodes, as will be discussed presently.

In this embodiment, printed ballot 105 includes borderlines 106 and 107 extending along edges 103*a*-103*d* of front and back surfaces 101 and 102, respectfully. Borderlines 106 and 107 can be of many different types, but here they are printed dashed lines. Borderlines 106 and 107 are desired to be spaced within a predetermined range of distances from edge 103, wherein the range of distances is often between about one-half of a millimeter and about two millimeters. If borderlines 106 and 107 are printed outside of the predetermined range of distances from edge 103, the ballot can be discarded. Hence, it is desired to print the ballots so that they are not discarded and fewer are wasted.

In this embodiment, borderline 106 is spaced distances $L_1$, $L_2$, $L_3$ and $L_4$ from edges 103*a*, 103*b*, 103*c* and 103*d*, respectively, wherein it is desired that distances $L_1$, $L_2$, $L_3$ and $L_4$ be driven to equal the predetermined distance. Further, borderline 107 is spaced distances $L_5$, $L_6$, $L_7$ and $L_8$ from edges 103*a*, 103*b*, 103*c* and 103*d*, respectively, wherein it is desired that distances $L_5$, $L_6$, $L_7$ and $L_8$ be driven to equal one millimeter. It is generally desirable to have distances $L_1$-$L_8$ be equal so that borderlines 106 and 107 are centered on surfaces 101 and 102, respectively. Further, it is generally desirable to have distances $L_1$-$L_8$ be equal so that the skew of borderlines 106 and 107 is reduced. It should be noted that indicia 110 and 111 and barcodes 108 and 109 are printed within the predetermined position tolerances in response to centering borderlines 106 and 107. Further, the skew of indicia 110 and 111 and barcodes 108 and 109 is reduced in response to reducing the skew of borderlines 106 and 107.

The skew of borderlines 106 and 107 can be characterized in many different ways. In this example, the skew of borderline 106 corresponds to the difference between distances $L_1$ and $L_2$, as well as the difference between $L_3$ and $L_4$. The amount of skew of borderline 106 increases as the differences between $L_1$ and $L_2$ and $L_3$ and $L_4$ increase. Further, the amount of skew of borderline 106 decreases as the differences between $L_1$ and $L_2$ and $L_3$ and $L_4$ decreases. The amount of skew of borderline 106 changes when it is rotated by an angle $\theta$ about a reference line 116, wherein reference line 116 extends perpendicular to surfaces 101 and 102. It should be noted that borderline 106 is not skewed when angle $\theta$ is zero degrees and distances $L_1$ and $L_2$ are equal and distances $L_3$ and $L_4$ are equal.

The skew of borderline 107 corresponds to the difference between distances $L_5$ and $L_6$, as well as the difference between $L_7$ and $L_8$. The amount of skew of borderline 107 increases as the differences between $L_5$ and $L_6$ and $L_7$ and $L_8$ increase. Further, the amount of skew of borderline 107 decreases as the differences between $L_5$ and $L_6$ and $L_7$ and $L_8$ decreases. The amount of skew of borderline 107 changes when it is rotated by angle $\theta$ about reference line 116.

It should be noted that borderline 107 is not skewed when angle $\theta$ is zero degrees and distances $L_5$ and $L_6$ are equal and distances $L_7$ and $L_8$ are equal. It should also be noted that borderline 106 is centered when distances $L_1$ and $L_3$ are equal and distances $L_2$ and $L_4$ are equal. Further, borderline 107 is centered when distances $L_5$ and $L_7$ are equal and distances $L_6$ and $L_8$ are equal.

Figure 3A:
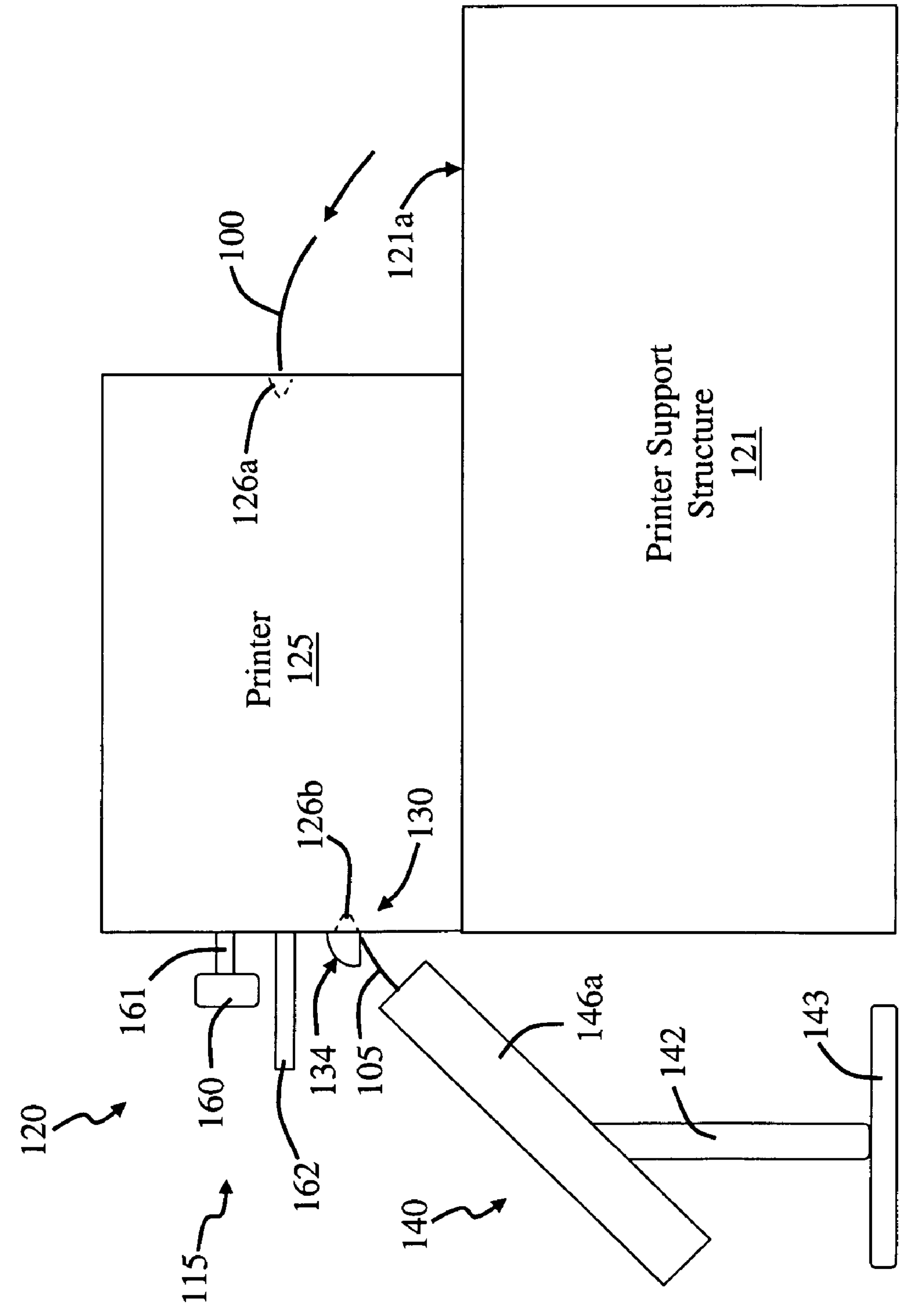
FIG. 3*a* is a side view of an election ballot printing system, in accordance with the invention.
Figure 3B:
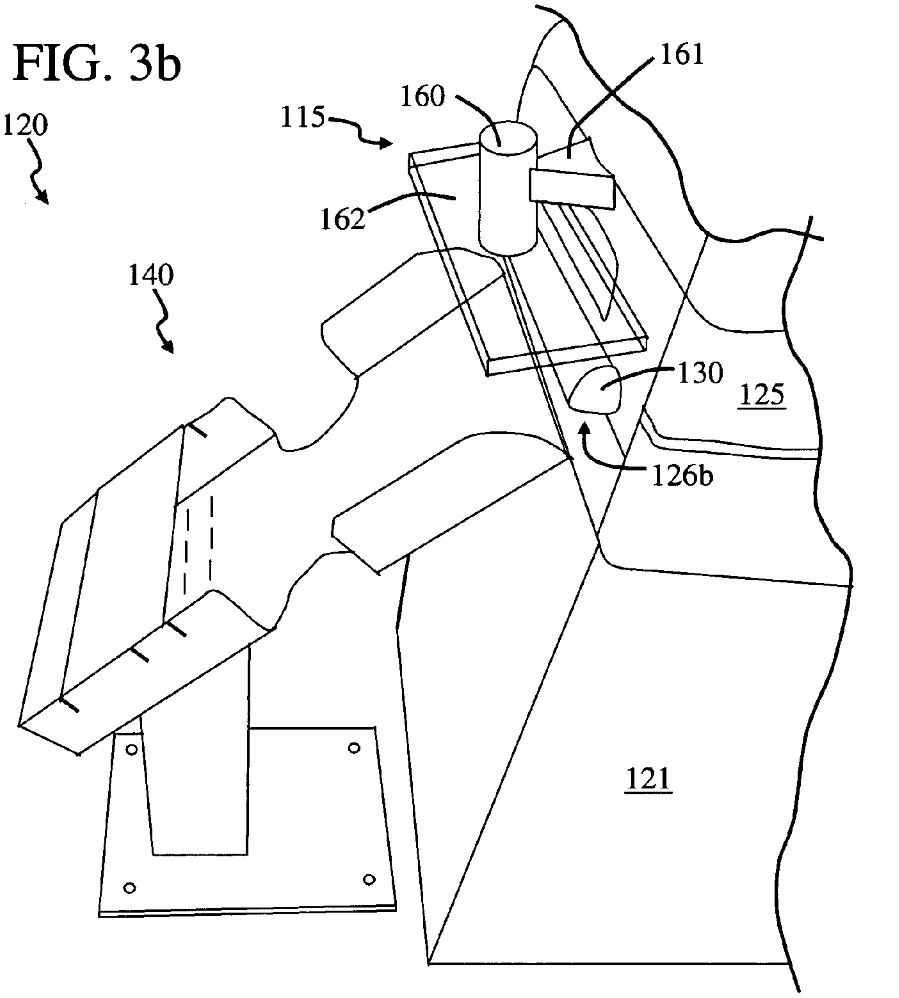
FIG. 3*b* is a perspective view of an output end of the printer of FIG. 3*a*, in accordance with the invention.

FIG. 3*a* is a side view of an election ballot printing system 120, in accordance with the invention, and FIG. 3*b* is a perspective view of an output end 115 thereof. In this embodiment, election ballot printing system 120 includes a printer 125 carried on an upper surface 121*a* of a printer support structure 121. Further, election ballot printing system 120 includes an acceptance tray assembly 140, as will be discussed in more detail with FIGS. 5*a* and 5*b*.

More information regarding various components of election ballot printing system 120 can be found in U.S. patent application Ser. No. 12/055,303, entitled ELECTION BALLOT PRINTING SYSTEM AND METHOD, U.S. patent application Ser. No. 12/055,308, entitled METHOD OF OPERATING AN ELECTION BALLOT PRINTING SYSTEM and U.S. patent application Ser. No. 12/055,288, entitled FEED TRAY EXTENSION FOR AN ELECTION BALLOT PRINTING SYSTEM, each being filed on an event date herewith, by the same inventors, the contents of each of which are incorporated herein by reference in their entirety.

Printer support structure 121 can be of many different types, such as a mobile or stationary support structure. Examples of mobile and stationary support structures include a cart and table, respectively. A mobile support structure generally includes wheels so that it can be easily moved from one location to another.

Printer 125 can be of many different types, such as an ILUMINA digital color press manufactured by XANTE Corporation. In this embodiment, printer 125 includes an input port 126*a* which receives ballots, such as ballots 100 and/or 105. For example, input port 126*a* can receive ballots that are printed on one side, but not the other side. In one example, the ballot includes indicia on front surface 101, but not back surface 102 and it is desirable to print indicia on back surface 102. In another example, the ballot includes indicia on back surface 102, but not front surface 101 and it is desirable to print indicia on front surface 101.

Printer 125 includes an output port 126*b* which outputs a ballot so it is received by acceptance tray assembly 140. The ballot outputted through output port 126*b* can include indicia printed on one side, but not the other side. For example, the ballot outputted through output port 126*b* can include indicia on front surface 101, but not back surface 102. In another example, the ballot outputted through output port 126*b* can include indicia on back surface 102, but not front surface 101.

In this embodiment, election ballot printing system 120 includes an electronic imaging device 160 directed at output port 126*b*. Electronic imaging device 160 receives information corresponding to the ballot outputted through output port 126*b*. The information corresponding to the ballot outputted through output port 126*b* can be of many different types, such as that discussed in more detail above with FIGS. 1*a*-1*c* and FIGS. 2*a*-2*c*. Electronic imaging device 160 images the ballot outputted through output port 126*b* in response to an indication that the ballot is being outputted, as will be discussed in more detail below with FIG. 4.

In this embodiment, electronic imaging device 160 is carried by printer 125. Electronic imaging device 160 can be carried by printer 125 in many different ways. In this embodiment, electronic imaging device 160 is carried by printer 125 by attaching it thereto with a support arm 161, wherein support arm 161 extends over output port 126*b*. In general, however, electronic imaging device 160 can be positioned at any location in which it is directed at output port 126*b* so it can receive information corresponding to the ballot outputted through output port 126*b*.

Electronic imaging device 160 can be of many different types. In one embodiment, electronic imaging device 160 is a camera manufactured by Lake Image Systems which has Model No. MNR2PS630PV3. When electronic imaging device 160 is a camera, the information it provides corresponds with an image of the indicia. However, it should be noted that other types of cameras can be used. For example, in some embodiments, electronic imaging device 160 is a video camera, such as those manufactured by Lake Image Systems. When electronic imaging device 160 is a video camera, the information it provides corresponds with a video of the indicia.

In other embodiments, electronic imaging device 160 is a bar code reader. When electronic imaging device 160 is a bar code reader, the information it provides corresponds with bar code information, such as bar codes 108 and/or 109 (FIGS. 2*b* and 2*c*). Examples of bar code readers are provided in U.S. Pat. Nos. 6,070,801, 6,095,420, 6,343,742, 6,655,595, 6,728,015, as well as the references cited therein.

In this embodiment, a transparent support structure 162 is positioned between electronic imaging device 160 and output port 126*b*. Electronic imaging device 160 is directed at output port 126*b* through transparent support structure 162. In this way, electronic imaging device 160 images the ballot outputted through output port 126*b* through transparent support structure 162. Transparent support structure 162 is positioned to prevent debris from falling on the ballot being outputted through output port 126*b*. In some embodiments, transparent support structure 162 engages electronic imaging device 160 so that structure 162 provides support to it.

Figure 4:
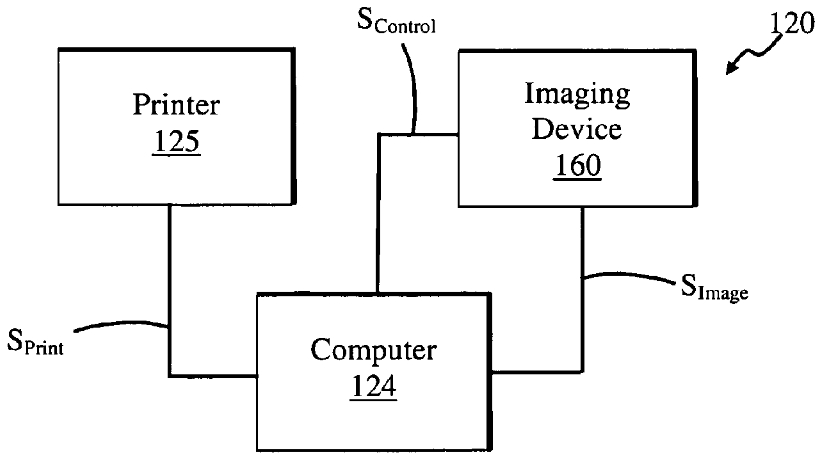
FIG. 4 is a block diagram of the election ballot printing system of FIG. 3*a*.

FIG. 4 is a block diagram of election ballot printing system 120, in accordance with the invention. In this embodiment, election ballot printing system 120 includes a computer 124 operatively coupled to printer 125 and electronic imaging device 160. Computer 124 is operatively coupled to printer 125 and electronic imaging device 160 because it is in communication with them and can control their operation. Computer 124 can be of many different types, such as a desktop and laptop computer. Computer 124 generally operates software which allows it to communicate with printer 125 and electronic imaging device 160. More information regarding software operated by computer 124 can be found in the above-referenced U.S. patent application Ser. Nos. 12/055,303, 12/055,308 and 12/055,288, as well as in above-referenced U.S. Provisional Application No. 60/908,141.

In operation, computer 124 provides printer 125 with information corresponding to the information to be printed on an unprinted ballot. The information can be of many different types such as that discussed in more detail above with FIGS. 1*a*-1*c* and FIGS. 2*a*-2*c*. In this embodiment, the information to be printed on the unprinted ballot is provided to printer 125 as signal $S_{Print}$.

Computer 124 stores information provided by electronic imaging device 160, wherein the information corresponds with the information printed on a ballot outputted through output port 126*b*. In this embodiment, the information corresponding with the ballot outputted by printer 125 is provided to computer 124 as signal $S_{Image}$.

Computer 124 provides electronic imaging device 160 with information regarding when to determine the information corresponding to the printed ballot outputted through output port 126*b*. Computer 124 provides a signal $S_{Control}$ to electronic imaging device 160, wherein electronic imaging device 160 determines, in response to signal $S_{Control}$ information corresponding to the printed ballot outputted through output port 126*b*. In this way, computer 124 is operatively coupled to printer 125 and electronic imaging device 160.

Figure 5A:
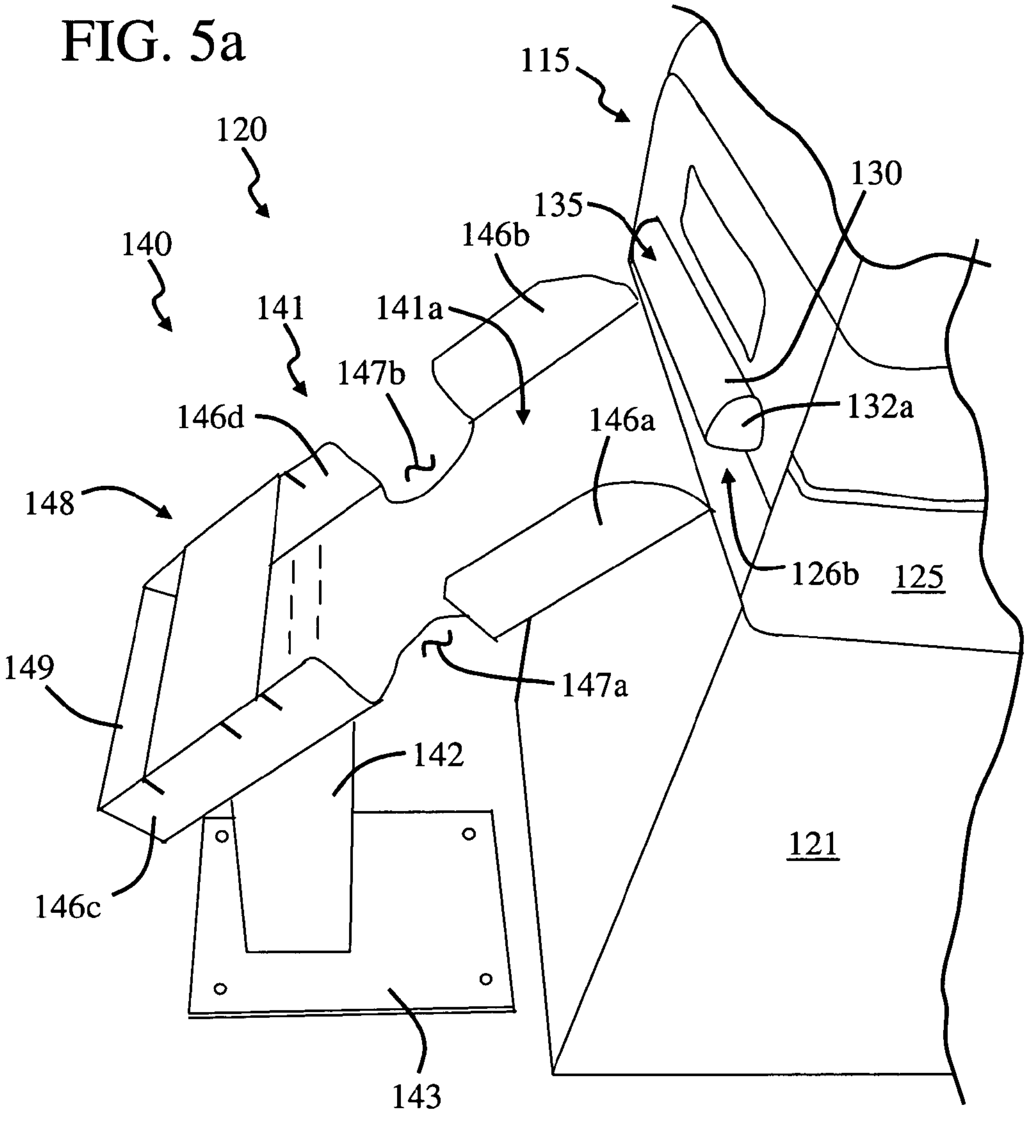
FIGS. 5*a* and 5*b* are perspective views of the output end of the printer of FIG. 3*a*.
Figure 5B:
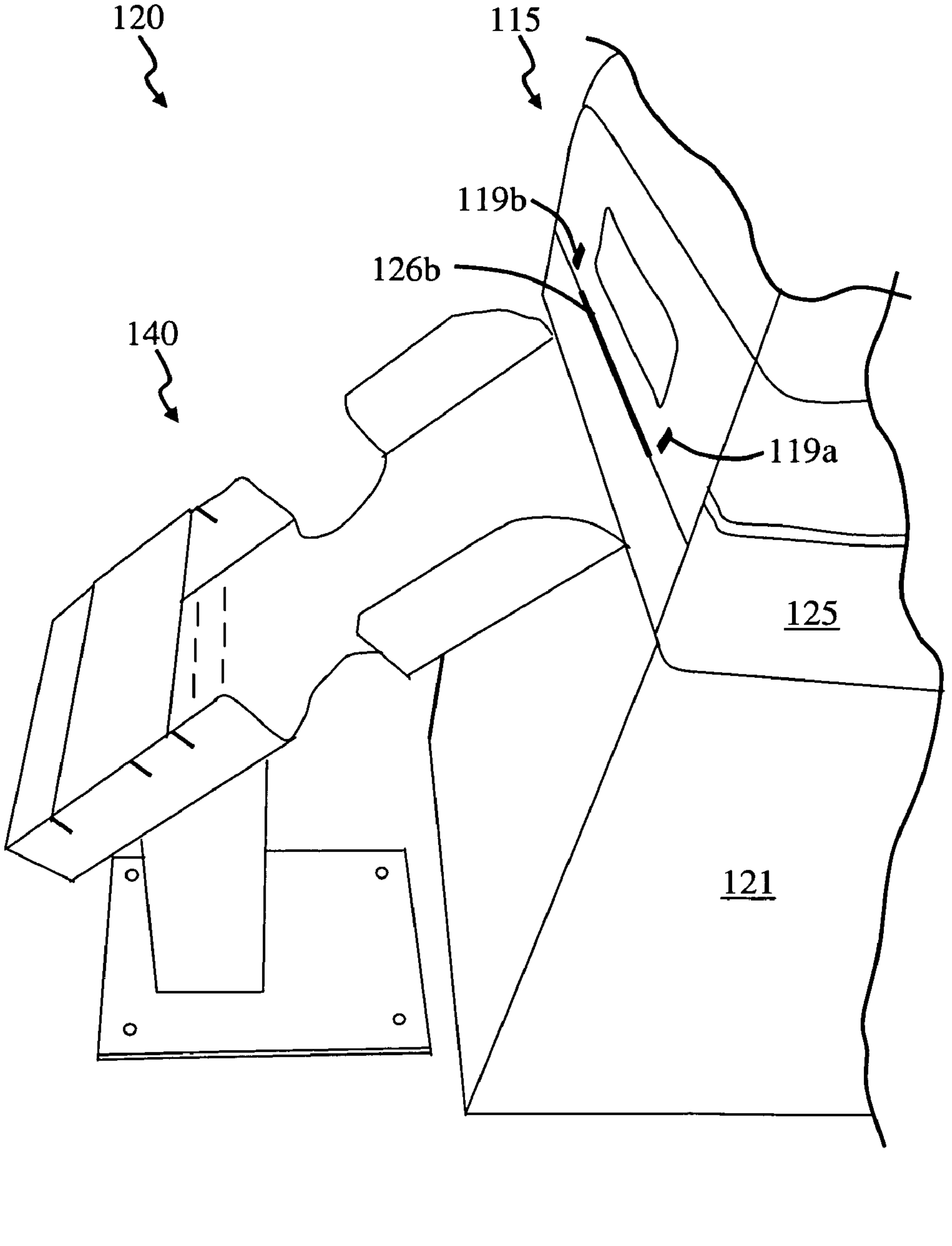

FIGS. 5*a* and 5*b* are side perspective views of output end 115 of election ballot printing system 120. Acceptance tray assembly 140 is positioned proximate to output end 115 and is aligned with output port 126*b* to accept ballots outputted therefrom. In this embodiment, acceptance tray assembly 140 includes a base 143 and leg 142, wherein leg 142 extends upwardly from base 143. Further, acceptance tray assembly

140 includes a ballot support tray 141 which is supported by leg 142 and base 143. Ballot support tray 141 is tilted downwardly away from output port 126*b* so that ballots outputted therefrom will flow downwardly and away from output port 126*b*. Ballots outputted from output port 126*b* flow downwardly along ballot support tray 141 in response to gravity.

In this embodiment, ballot support tray 141 includes a ballot support structure 141*a*, which is flat so that ballots can more easily slide along its length in response to gravity. Further, ballot support tray 141 includes opposed proximal guiderails 146*a* and 146*b* and opposed distal guide rails 146*c* and 146*d*, wherein guiderails 146*a*-146*d* extend upwardly from support structure 141*a*. Guide rails 146*a*-146*d* restrict the ballot from moving along the width of support structure 141*a*. For example, guide rails 146*a*-146*d* restrict the ballot from moving along the width of support structure 141*a* by engaging edges 103*b* or 103*d* (FIGS. 1*b* and 1*c*).

Ballot support tray 141 includes an end plate 149 which extends between opposed distal guide rails 146*c* and 146*d*. End plate 149 restricts the ballot from moving along the length of support structure 141*a* in response to gravity. For example, end plate 149 restricts the ballot from moving along the length of support structure 141*a* by engaging edge 103*a* or 103*c* (FIGS. 1*b* and 1*c*). It should be noted that the length of ballot support structure 141*a* extends perpendicular to end plate 149, and the width of ballot support structure 141*a* extends parallel to end plate 149.

The distance that end plate 149 extends away from ballot support structure 141*a* determines the number of ballots that can be accepted by ballot support tray 141. It should be noted that the ballots accepted by ballot support tray 141 are typically stacked on each other. Ballot support tray 141 can accept more ballots stacked on each other when end plate 149 extends a greater distance away from ballot support structure 141*a*. Further, ballot support tray 141 accepts fewer ballots stacked on each other when end plate 149 extends a smaller distance away from ballot support structure 141*a*.

In this embodiment, ballot support structure 141*a* includes opposed openings 147*a* and 147*b*, wherein opening 147*a* extends between proximal guide rail 146*a* and distal guide rail 146*c*, and opening 147*b* extends between proximal guide rail 146*b* and distal guide rail 146*d*. Opposed openings 147*a* and 147*b* provide the ability to engage the downwardly facing surface of a ballot adjacent to support structure 141*a* and lift it upwardly. The downwardly facing surface of the ballot can correspond to front surface 101 and back surface 102 (FIG. 1) of the ballot. Hence, openings 147*a* and 147*b* are typically sized and shaped to allow a person's hands to extend therethrough and engage the downwardly facing surface of the ballot carried by ballot support structure 141*a*. In this way, ballots can be removed from acceptance tray assembly 140 easier.

In operation, support structure 141*a* engages front or back surfaces 101 and 102 of the ballot carried thereon, and guide rails 146*a* and 146*b* can engage the opposed edges of the printed ballot. In some situations, guide rails 146*a* and 146*b* engage opposed edges 103*b* and/or 103*d*, respectively, and support structure 141*a* engages surface 101 so that surface 102 faces upwardly and away from support structure 141*a*. Further, end plate 149 engages edge 103*a* or 103*c*. In other situations, guide rails 146*a* and 146*b* engage opposed edges 103*d* and/or 103*b*, respectively, and support structure 141*a* engages surface 102 so that surface 101 faces upwardly and away from support structure 141*a*. Further, end plate 149 engages edge 103*a* or 103*c*. In this way, ballot support tray 141 accepts the ballot.

It should be noted that, in general, it is desired to generate ballots having different dimensions, such as different lengths L and widths W (FIG. 1*a*). As discussed in more detail above, the dimensions of the ballot depends on many different factors, such as the election it is to be used in. Hence, it is desirable for ballot support tray 141 to be able to accept ballots having different dimensions.

In accordance with the invention, ballot support tray 141 includes an acceptance tray housing 148 which is positioned to hold the ballot between it and ballot support structure 141*a*. In this embodiment, acceptance tray housing 148 extends between distal guide rails 146*c* and 146*d* and is repeatably moveable towards and away from end plate 149. In general, acceptance tray housing 148 is moved towards end plate 149 when it is desirable to have ballot support tray 141 accept longer ballots (i.e. length L is greater). Further, acceptance tray housing 148 is moved away from end plate 149 when it is desirable to have ballot support tray 141 accept shorter ballots (i.e. length L is shorter). In this way, ballot support tray 141 is able to accept ballots of different dimensions. The positioning of acceptance tray housing 148 is typically chosen so that a ballot supported by support structure 141*a* extends over opposed openings 147*a* and 147*b* and the ballot can be more easily removed from tray 141, as discussed in more detail above.

Figure 5C:
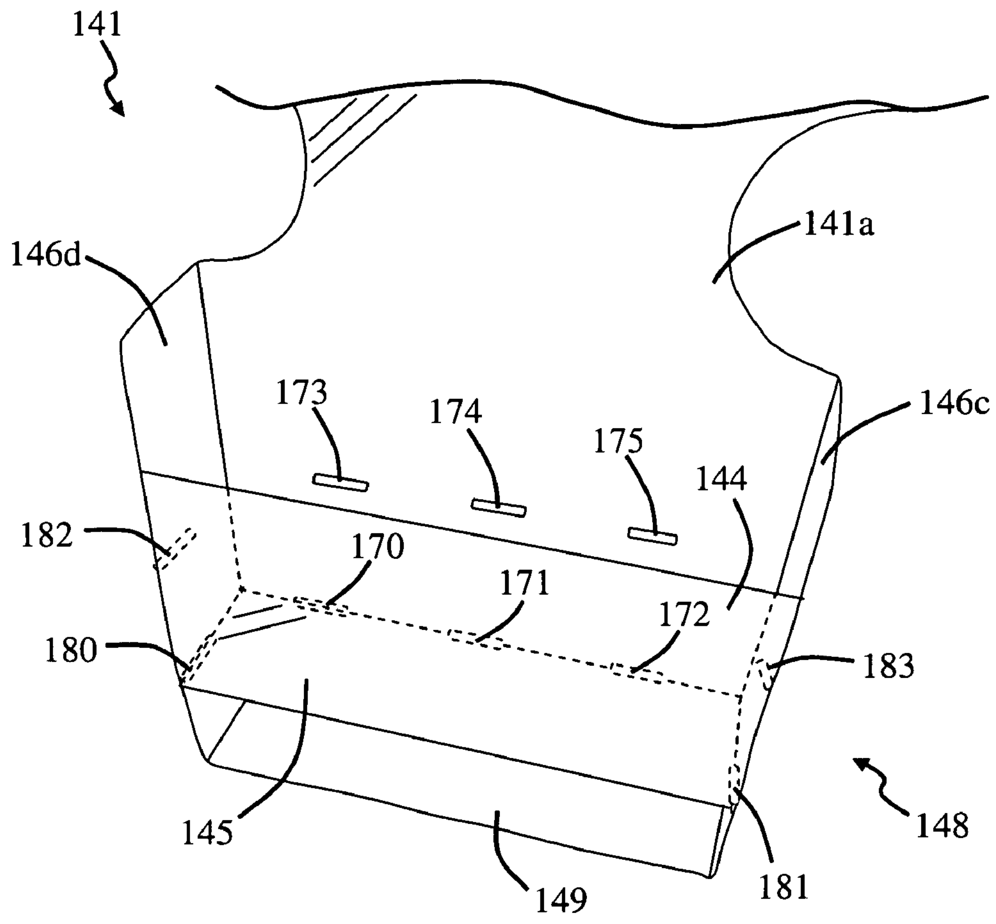
FIG. 5*c* is a perspective view of a ballot support tray included with the election ballot printing system of FIG. 3*a*.

FIG. 5*c* is a perspective view of ballot support tray 141, showing acceptance tray housing 148 in more detail. In this embodiment, acceptance tray housing 148 includes an outer plate 144 and end plate 145, wherein outer plate 144 extends parallel to ballot support structure 141*a* and perpendicular to end plates 145 and 149. Further, end plate 145 extends parallel to end plate 149 and perpendicular to outer plate 144 and ballot support structure 141*a*.

In this embodiment, acceptance tray housing 148 is repeatably removeable from ballot support tray 141. When acceptance tray housing 148 is included with ballot support tray 141, endplate 145 engages edges 103*a* or 103*b* of the ballot carried by ballot support structure 141*a*. Further, when acceptance tray housing 148 is removed from ballot support tray 141, endplate 149 engages edges 103*a* or 103*b* of the ballot carried by ballot support structure 141*a*.

The distance that end plate 145 extends away from ballot support structure 141*a* determines the number of ballots that can be accepted by ballot support tray 141. Ballot support tray 141 can accept more ballots stacked on each other when end plate 145 extends a greater distance away from ballot support structure 141*a*. Further, ballot support tray 141 accepts fewer ballots stacked on each other when end plate 145 extends a smaller distance away from ballot support structure 141*a*.

The distance that outer plate 144 is away from ballot support structure 141*a* determines the number of ballots that can be accepted by ballot support tray 141. Ballot support tray 141 can accept more ballots stacked on each other when outer plate 144 is positioned a greater distance away from ballot support structure 141*a*. Further, ballot support tray 141 accepts fewer ballots stacked on each other when outer plate 144 is positioned a smaller distance away from ballot support structure 141*a*. It should be noted that the position of outer plate 144 from ballot support structure 141 depends on how far distal guide rails 146*c* and 146*d* extend from ballot support structure 141*a*. The position of outer plate 144 from ballot support structure 141 is greater when distal guide rails 146*c* and 146*d* extend a greater distance away from ballot support structure 141*a*, and the position of outer plate 144 from ballot support structure 141 is smaller when distal guide rails 146*c* and 146*d* extend a smaller distance away from ballot support structure 141*a*.

In this embodiment, ballot support tray 141 includes grooves for holding end plate 145 at a desired position relative to end plate 149. The grooves included with ballot support tray 141 can be of many different shapes, such as circular, but here they are shown as being rectangular. Further, the grooves included with ballot support tray 141 can be positioned at many different locations to hold end plate 145 at the desired position relative to end plate 149, several of which will be discussed in more detail presently.

In this embodiment, ballot support tray 141 includes grooves 170, 171 and 172 and grooves 173, 174 and 175, all of which extend through paper tray support structure 141*a*. Grooves 170, 171 and 172 are positioned towards end plate 149 and grooves 173, 174 and 175 are positioned further away from end plate 149 than grooves 170, 171 and 172. In this way, grooves 170, 171 and 172 are positioned between grooves 173, 174 and 175 and end plate 149. Grooves 170, 171 and 172 are positioned a first predetermined distance from end plate 149 and grooves 173, 174 and 175 are positioned a second predetermined distance from end plate 149, wherein the first predetermined distance is less than the second predetermined distance. It should be noted that, in general, ballot support tray 141 includes one or more grooves that are positioned at predetermined distances from end plate 149 to hold end plate 145 at the desired position relative to end plate 149. Hence, the number of grooves shown in this embodiment is for illustrative purposes.

In this embodiment, end plate 145 is engaged with grooves 170, 171 and 172 so that end plate 145 is positioned the first predetermined distance from end plate 149. It should be noted, however, that end plate 145 can be engaged with grooves 173, 174 and 175 so that end plate 145 is positioned the second predetermined distance from end plate 149. In general, end plate 145 is positioned the first predetermined distance from end plate 149 when length L of the ballot is increased, and end plate 145 is positioned the second predetermined distance from end plate 149 when length L of the ballot is decreased.

In this embodiment, ballot support tray 141 includes grooves 180 and 182 which extend through distal guide rail 146*d* and grooves 181 and 183 which extend through distal guide rail 146*c*. Grooves 180, 181, 182 and 183 extend perpendicular to ballot support structure 141*a* and parallel to end plates 145 and 149. Grooves 180 and 181 are positioned the first predetermined distance from end plate 149 and grooves 182 and 183 are positioned the second predetermined distance from end plate 149. Hence, end plate 145 engages grooves 180 and 181 when it engages grooves 170-172. Further, end plate 145 engages grooves 182 and 183 when it engages grooves 173-175. End plate 145 can engage grooves 170-175 and grooves 180-183 in many different ways, one of which will be discussed in more detail presently.

Figure 5D:
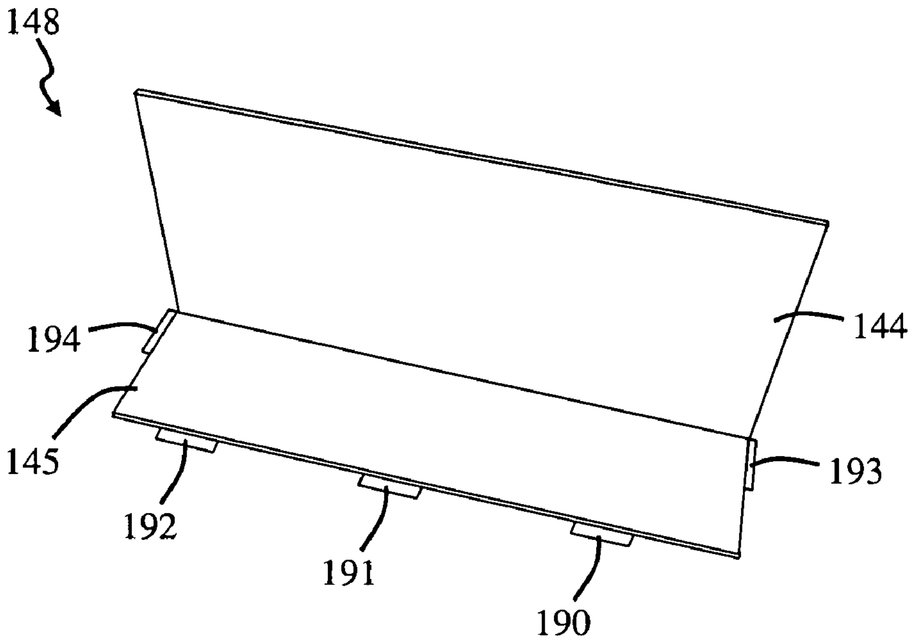
FIG. 5*d* is a perspective view of an acceptance tray housing included with the ballot support tray of FIG. 5*c*.

FIG. 5*d* is a perspective view of one embodiment of acceptance tray housing 148. In this embodiment, acceptance tray housing 148 includes tabs 190, 190 and 192 which extend from end plate 145, wherein tabs 190, 191 and 192 extend parallel to end plate 145. Tabs 190, 191 and 192 extend from end plate 145 at an edge of plate 145 opposed to outer plate 144. Tabs 190, 191 and 192 are sized, shaped and spaced apart so that they can be received by grooves 170, 171 and 172, respectively, as shown in FIG. 5*c*. Movement of end plate 145 relative to end plate 149 is restricted when grooves 170, 171 and 172 receive tabs 190, 191 and 192, respectively. Tabs 190, 191 and 192 are also sized, shaped and spaced apart so that they can be received by grooves 173, 174 and 175, respectively, as shown in FIG. 5*c*. Movement of end plate 145 relative to end plate 149 is restricted when grooves 173, 174 and 175 receive tabs 190, 191 and 192, respectively.

In this embodiment, acceptance tray housing 148 includes tabs 193 and 194 which extend from end plate 145, wherein tabs 193 and 194 extend parallel to end plate 145. Tabs 193 and 194 extend from end plate 145 at opposed edges of plate 145 which are perpendicular to outer plate 144. Tabs 193 and 194 are sized, shaped and spaced apart so that they can be received by the grooves which extend through distal guide rails 146*c* and 146*d*, respectively. For example, tabs 193 and 194 are received by grooves 180 and 181, respectively, in FIG. 5*c*. Movement of acceptance tray housing 148 relative to ballot support structure 141*a* is restricted when grooves 180 and 181 receive tabs 193 and 194, respectively. Tabs 193 and 194 can also be received by grooves 182 and 183 respectively. Movement of acceptance tray housing 148 relative to ballot support structure 141*a* is restricted when grooves 182 and 183 receive tabs 193 and 194, respectively.

It should be noted that the positioning of end plate 145 relative to end plate 149 depends on the positioning of tabs 190-194 relative to grooves 170-175, as well as grooves 180-183. For example, when tabs 190-192 are received by grooves 170-172 and tabs 193 and 194 are received by grooves 180 and 181, end plate 145 is positioned the first predetermined distance from end plate 149. Further, when tabs 190-192 are received by grooves 173-175 and tabs 193 and 194 are received by grooves 182 and 183, end plate 145 is positioned the second predetermined distance from end plate 149.

In general, acceptance tray housing 148 is moved towards end plate 149 when it is desirable to have ballot support tray 141 accept longer ballots (i.e. L is larger). Further, acceptance tray housing 148 is moved away from end plate 149 when it is desirable to have ballot support tray 141 accept shorter ballots (i.e. L is smaller). In this way, ballot support tray 141 is able to accept printed ballots of different dimensions. In general, the positioning of acceptance tray housing 148 is chosen so that the ballot supported by ballot support structure 141*a* extends over opposed openings 147*a* and 147*b* and they can be more easily removed from ballot support tray 141.

Figure 5E:
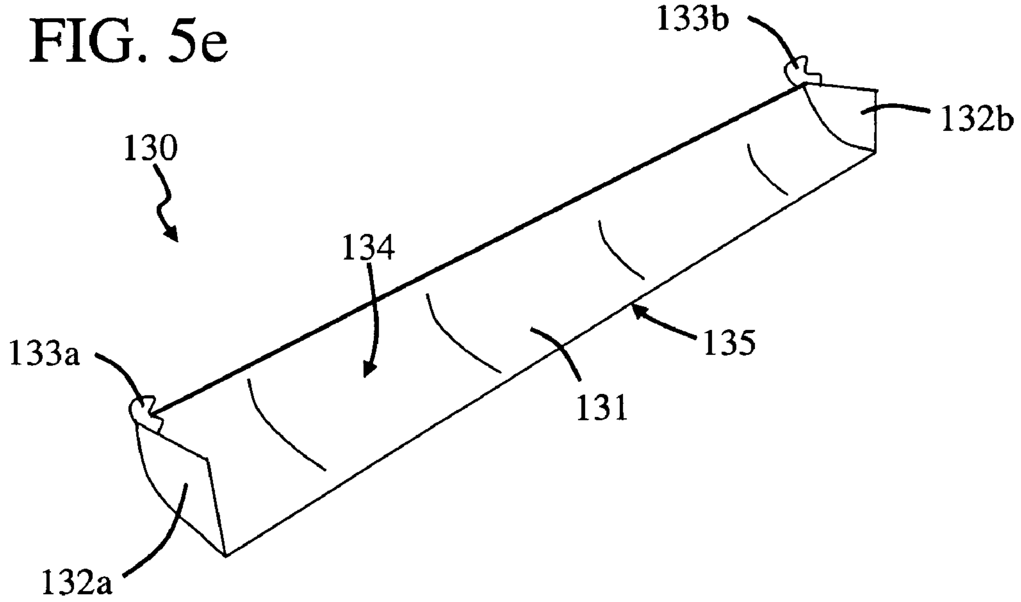
FIG. 5*e* is a perspective view of a turn-down bar included with the an election ballot printing system of FIG. 3*a*.

FIG. 5*e* is a perspective view of turn-down bar 130, in accordance with the invention. In this embodiment, turn-down bar 130 includes an elongate body portion 131 with sidewalls 132*a* and 132*b* attached to its opposing ends. Hooks 133*a* and 133*b* are attached to elongate body portion 131 near sidewalls 132*a* and 132*b*. Hooks 133*a* and 133*b* are for engaging corresponding openings 119*a* and 119*b* extending through printer 125, as shown in FIG. 5*b*. Elongate body portion 131 has a curved surface 134 so that when hooks 133*a* and 133*b* engage corresponding openings 119*a* and 119*b*, concave surface 134 faces output port 126*b* of printer 125, as shown in FIG. 3*a*.

In operation, when printed ballot 105 is outputted through output port 126*b*, it engages elongate body portion 131 and is diverted downwardly by concave surface 134. Printed ballot 105 slides along concave surface 134 where it engages an edge 135 of elongate body portion 131. Printed ballot 105 is straightened in response to engaging edge 135. Printed ballot 105 can be straightened in response to engaging edge 135 in many different ways. For example, the amount of curl of printed ballot 105 can be reduced in response to engaging edge 135. Printed ballot 135 is straightened so that it lies flat on ballot support tray 141. Printed ballot 105 is easier to sort and mail if it is straightened. Further, printed ballot 105 is easier to feed into input port 126*a* if it is straightened. Printed ballot 105 can have an amount of curl for many different reasons. For example, printer 125 generally includes one or more rollers which engage a ballot when it is being printed.

The ballot is known to curl in response to engaging the roller (s). Hence, election ballot printing system 120 includes a turn-down bar which restricts an amount of curl of a ballot being outputted by a printer.

Another problem encountered when printing ballots is that printed ballot 105 is often outputted from printer 125 with a curl. The curl is imparted to printed ballot 105 by the rollers (not shown) included with printer 125 which engage and move the paper. When the printed ballot 105 curls, it will not lie flat on surface 141*a*. When a printed ballot 105 has a curl, it is more difficult to sort and mail. It is also more difficult to insert a printed ballot 105 into an envelope and into other machines, such as a bar-code reader, if the ballot has a curl. Hence, it is desirable to reduce the amount of curl in ballot 105. There are many different ways to reduce the amount of curl, one of which will be discussed presently.

Figure 6A:
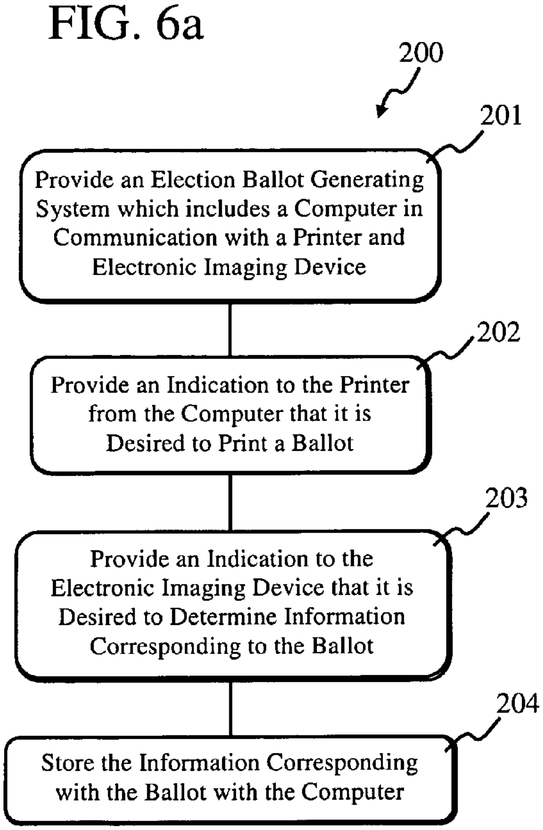
FIGS. 6*a* and 6*b* are flow diagrams of methods, in accordance with the invention, of providing a ballot.

FIG. 6*a* is a block diagram of a method 200, in accordance with the invention, of providing a ballot. In this embodiment, method 200 includes a step 201 of providing an election ballot printing system which includes a computer operatively coupled to a printer and electronic imaging device. The computer is operatively coupled to the printer and electronic imaging device because it can control their operation.

Method 200 includes a step 202 of providing an indication to the printer from the computer that it is desired to print a ballot. In one embodiment, the indication is provided to the printer from the computer as signal $S_{Print}$.

Method 200 includes a step 203 of providing an indication to the electronic imaging device that it is desired to determine information corresponding to the ballot. The information can be of many different types, such as indicia printed thereon. The indicia can include text and one or more barcodes. In one embodiment, the indication is provided to the electronic imaging device as signal $S_{Control}$.

Method 200 includes a step 204 of storing the information corresponding with the ballot with the computer. In one embodiment, the image is stored by flowing signal $S_{Image}$ to the computer. The computer stores information corresponding with signal $S_{Image}$.

Figure 6B:
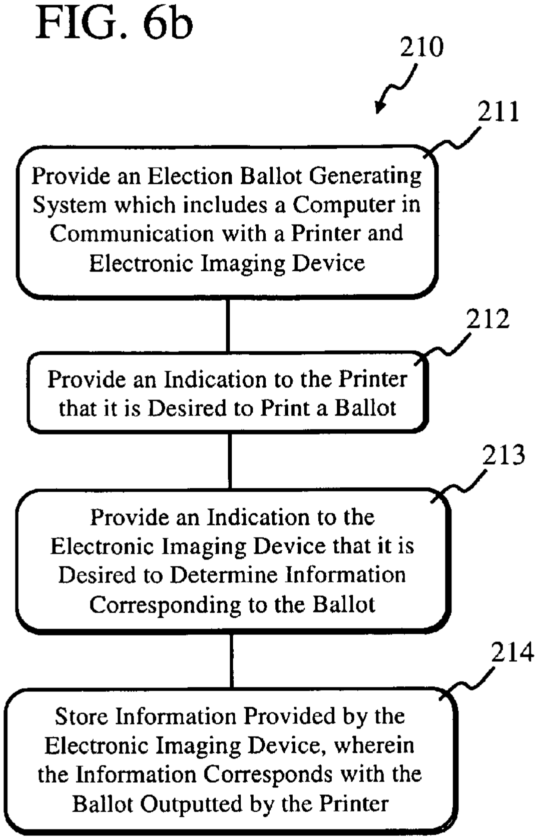

FIG. 6*b* is a block diagram of a method 210, in accordance with the invention, of providing a ballot. In this embodiment, method 210 includes a step 211 of providing an election ballot printing system which includes a computer operatively coupled to a printer and electronic imaging device.

Method 210 includes a step 212 of providing an indication to the printer that it is desired to print a ballot. In one embodiment, the indication is provided to the printer from the computer as signal $S_{Print}$.

Method 210 includes a step 213 of providing an indication to the electronic imaging device that it is desired to determine information corresponding to the ballot. The information can be determined in many different ways, such as by taking an image or video of the ballot. The information can also be determined by reading the bar code of the ballot with a bar-code reader. The indication can be provided to the electronic imaging device in response to control signal $S_{Control}$ from the computer. In some embodiments, the ballot is imaged in response to an indication that the ballot is being printed.

Method 210 includes a step 214 of storing information provided by the electronic imaging device, wherein the information corresponds with the ballot outputted by the printer. In one embodiment, the information is stored by flowing signal $S_{Image}$ to the computer, wherein the computer stores the information.

It should be noted that method 210 can include many other steps. For example, in some embodiments, method 210 includes engaging the ballot outputted by the printer with a turn-down bar. Method 210 can include imaging the ballot outputted by the printer through a transparent support structure. Further, method 210 can include receiving the ballot outputted by the printer with an acceptance tray. Method 210 can also include adjusting an acceptance tray housing included with the acceptance tray.

Figure 7:
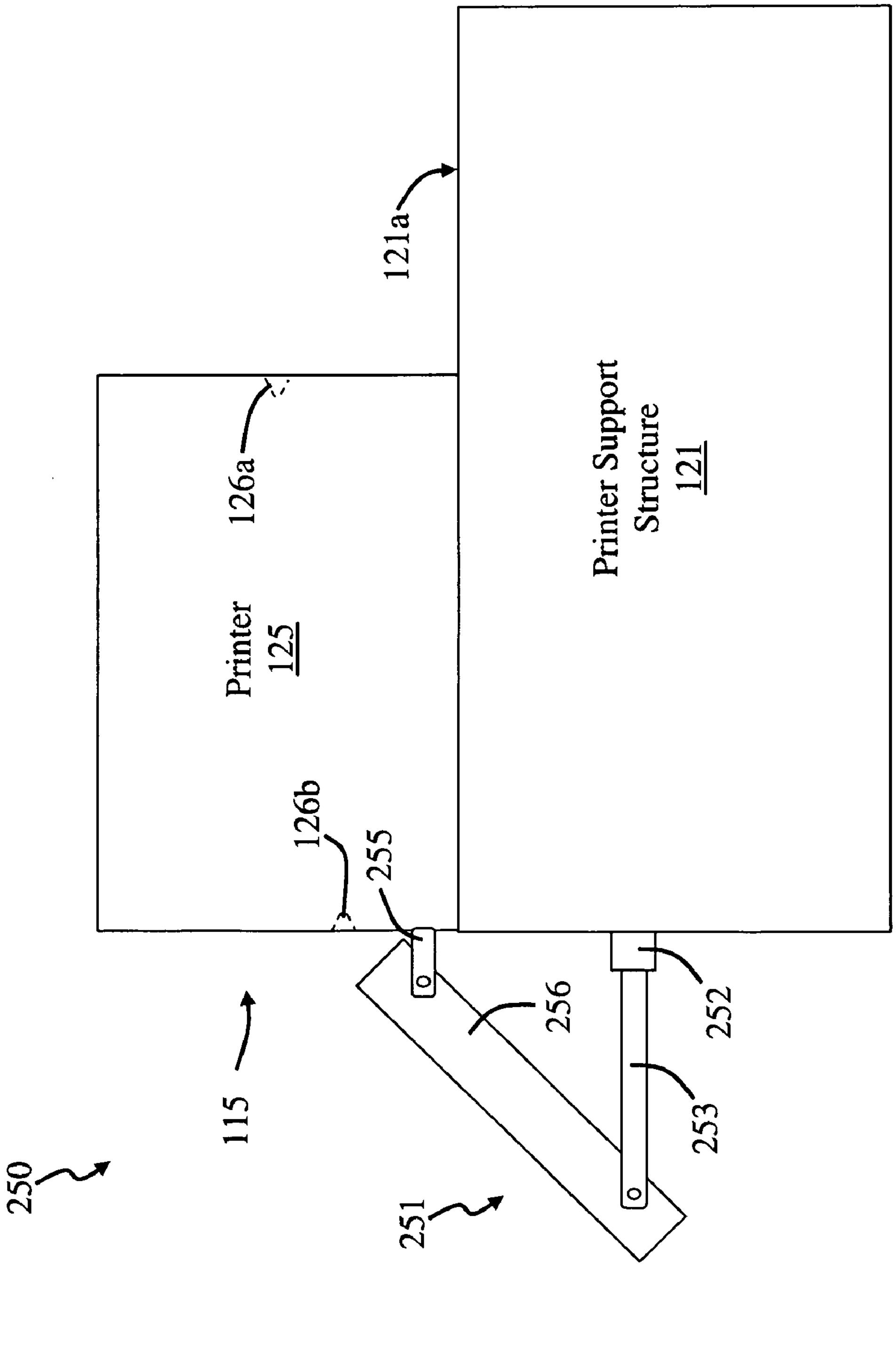
FIG. 7 is a side view of an election ballot printing system, in accordance with the invention.

FIG. 7 is a side view of an election ballot printing system 250, in accordance with the invention. In this embodiment printing system 250 includes printer support structure 121 which carries printer 125. In accordance with the invention, printing system 250 includes an acceptance tray assembly 251 which is carried by printer support structure 121. Acceptance tray assembly 251 which is carried by printer support structure 121 so that they can be moved together, along with printer 125, as a single unit. It should be noted, however, that acceptance tray assembly 251 is removeably coupled with printer support structure 121 and printer 125 in a repeatably removeable manner. Being able to remove acceptance tray assembly 251 is useful when moving election ballot printing system 250 from one location to another.

In this embodiment, acceptance tray assembly 251 includes a support arm 255 coupled with printer 125 and a support arm 253 coupled with printer support structure 121. Further, acceptance tray assembly 251 includes a ballot support tray 256, which can be the same or similar to the ballot support trays discussed in more detail above. In this embodiment, ballot support tray 256 extends between support arms 253 and 255, wherein support arm 253 is longer than support arm 255 so that ballot support tray 256 is angled downwardly away from output port 126*b*. In this way, ballot support tray 256 is positioned to receive a ballot outputted by output port 126*b*.

Figure 8:
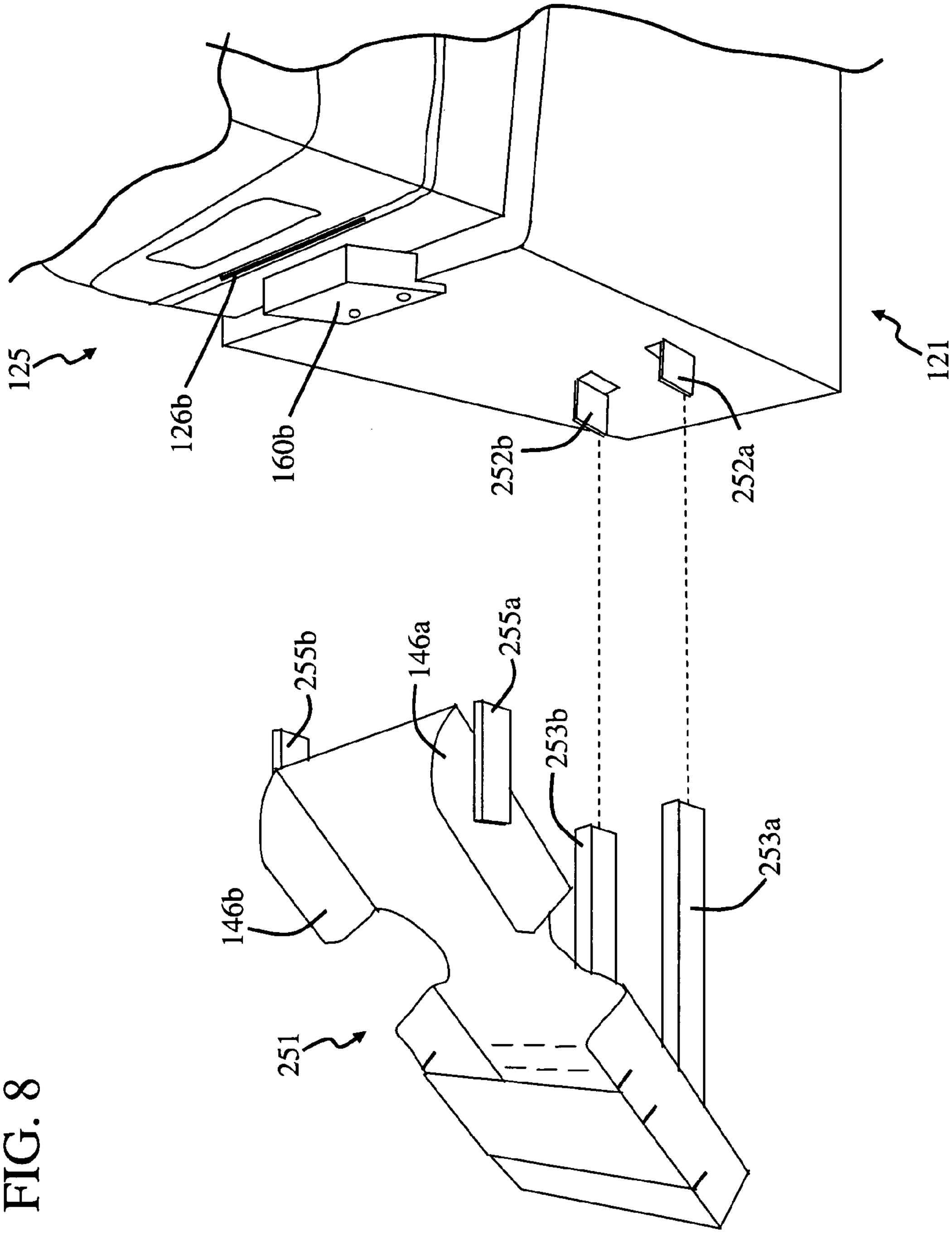
FIG. 8 is a perspective view of acceptance tray assembly included with the election ballot printing system of FIG. 7.

FIG. 8 is a perspective view of acceptance tray assembly 251, wherein it includes opposed support arms 253*a* and 253*b*, as well as opposed support arms 255*a* and 255*b*. In this embodiment, acceptance tray assembly 251 includes guiderails 146*a* and 146*b*, and support arms 255*a* and 255*b* extend from guiderails 146*a* and 146*b*, respectively. Acceptance tray assembly 251 include opposed brackets 252*a* and 252*b* for coupling to support arms 253*a* and 253*b*, respectively. In particular, support arms 253*a* and 253*b* are removeably coupled with brackets 252*a* and 252*b*, respectively. Brackets 252*a* and 252*b* can be positioned at many different locations, but here they are attached printer support structure 121. It should be noted that there are bracket which are not shown for coupling to support arms 255*a* and 255*b* in a repeatably removeable manner. The brackets for coupling to support arms 255*a* and 255*b* can be attached to printer support structure 121 or printer 125. As shown in FIG. 8, a lower camera 160*b* is positioned so it is facing upwardly and can record a downwardly facing surface of a ballot being outputted by output port 126*b*.

Figure 9:
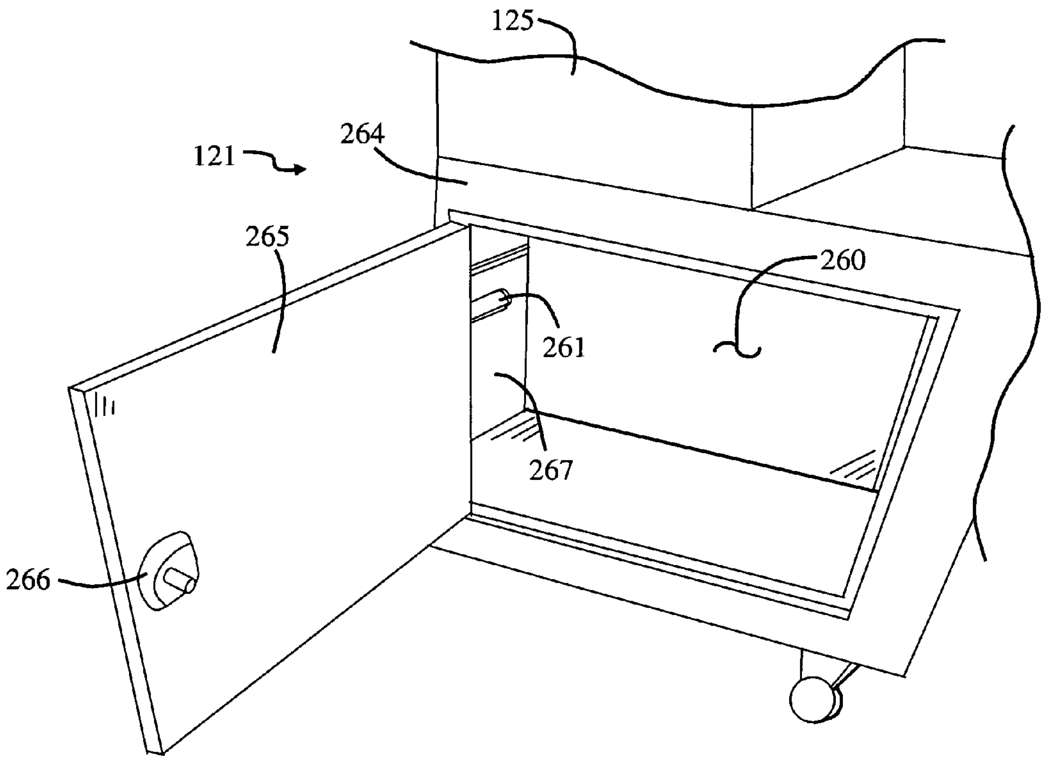
FIGS. 9 and 10 is a perspective view of one embodiment of a printer support structure included with the election ballot printing system of FIG. 7.
Figure 10:
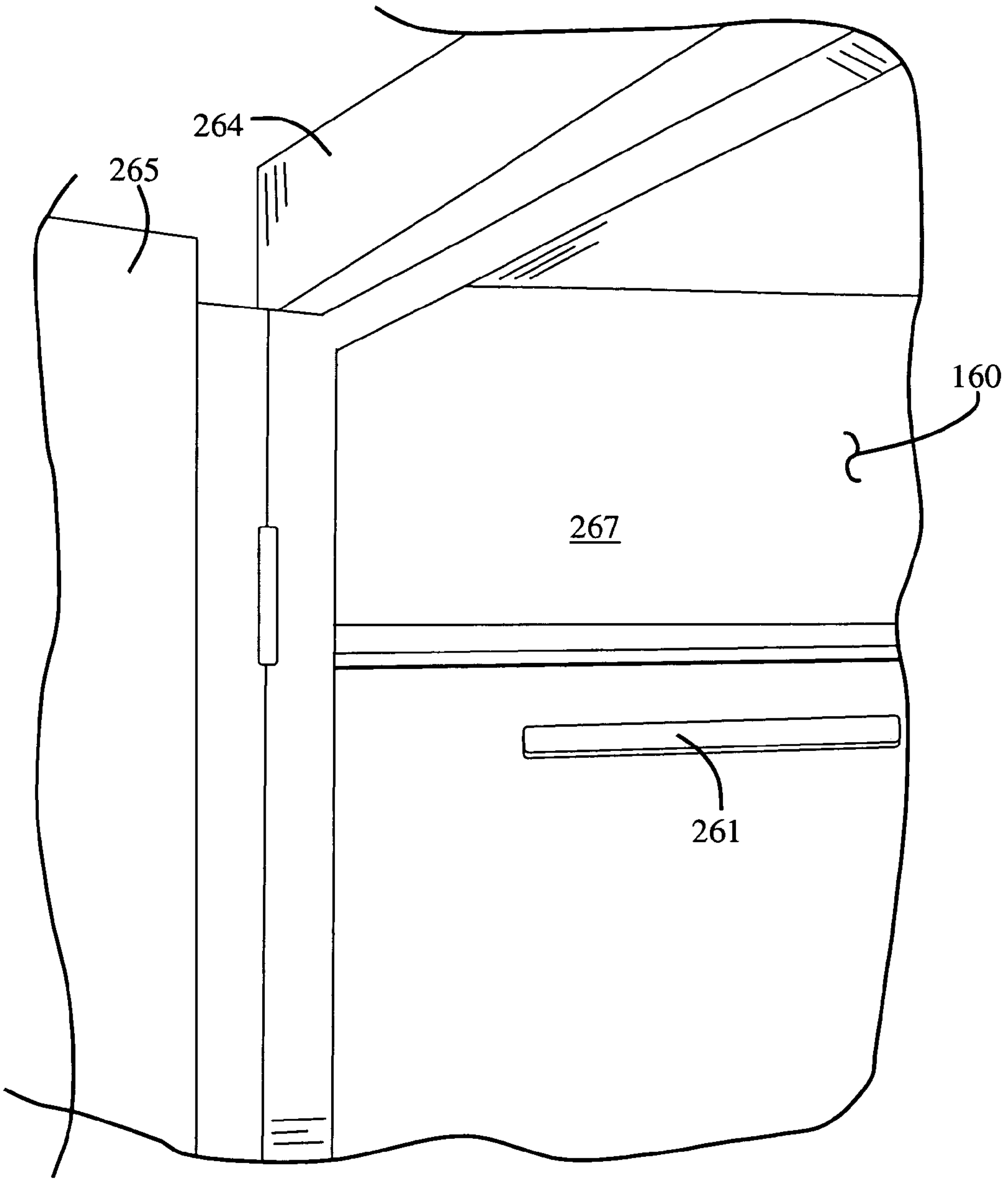

FIGS. 9 and 10 is a perspective view of one embodiment of printer support structure 121, wherein it includes an inner volume 260 bounded by sidewalls 264 and 267. Inner volume 260 is also bounded by a door 265 which is repeatably moveable toward and away from sidewall 264. Door 265 can be latched to sidewall 264 by using a latch 266. More information regarding printer support structure 121 can be found in the above-referenced patent applications. In this embodiment, sidewall 267 includes a slot 261 extending therethrough for receiving a discarded ballot, as will be discussed in more detail presently.

Figure 11:
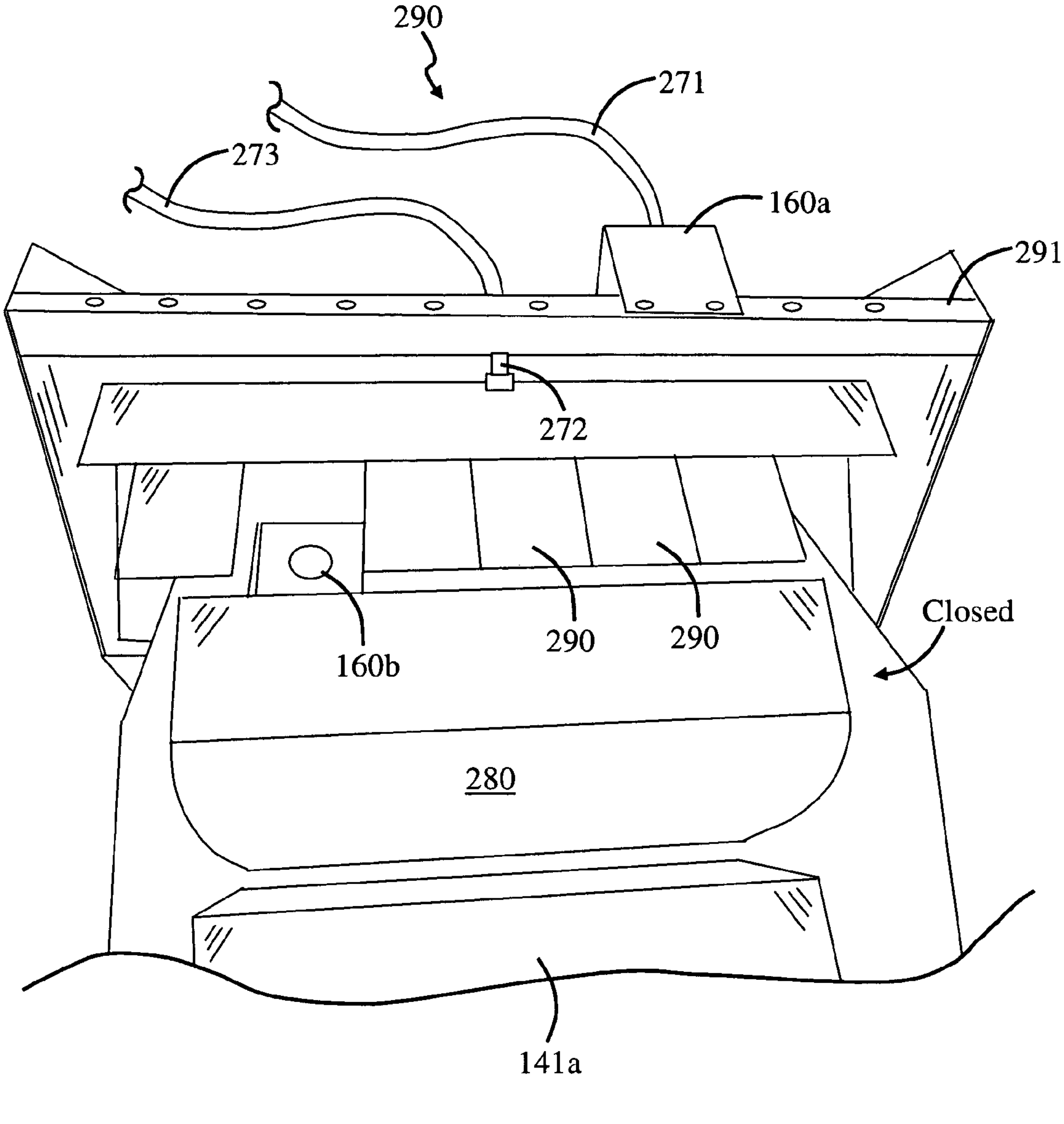
FIGS. 11 and 12 are top perspective views of one embodiment of an acceptance tray assembly 290, in accordance with the invention, and included with the election ballot printing system of FIG. 7.
Figure 12:
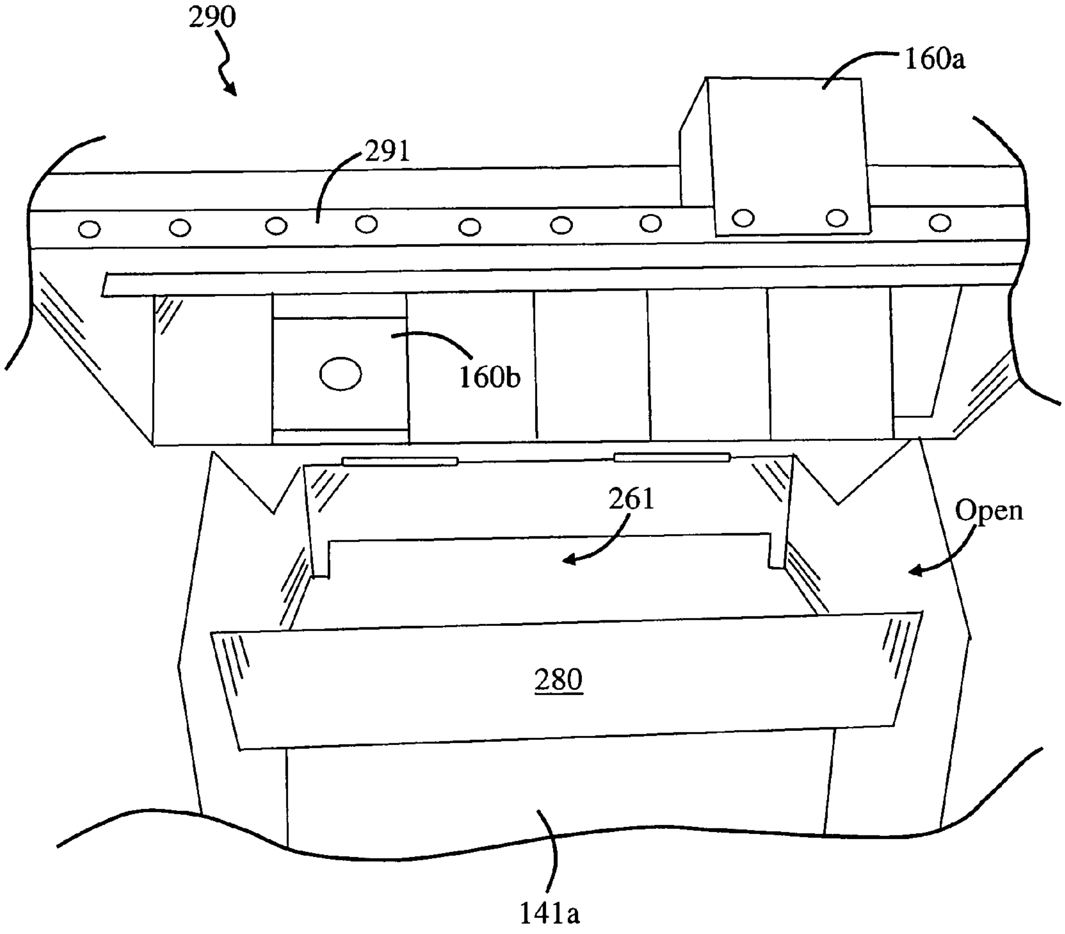

FIGS. 11 and 12 are top perspective views of one embodiment of an acceptance tray assembly 290, in accordance with the invention. Acceptance tray assembly 290 can be the same or similar to the other acceptance tray assemblies discussed herein. In this embodiment, however, acceptance tray assembly 290 includes a cross-bar 291 for holding a camera 160*a*, wherein camera 160*a* faces downwardly and can record a upwardly facing surface of a ballot being outputted by output port 126*b*. In this embodiment, cross-bar 291 includes a plurality of openings so that camera 160*a* can be positioned at a desired location relative to output port 126*b*.

Acceptance tray assembly 290 includes a cross-bar (not shown) for holding camera 160*b*, wherein camera 160*b* faces as described in more detail above. In this embodiment, Acceptance tray assembly 290 includes a slat 290 which can be positioned at desired locations relative to output port 126*b*. Here, a plurality of slats 290 are included and positioned to so that they do not block camera 160*b*. A sensor 272 is carried by acceptance tray assembly 290 and provides a signal to a computer system included with printing system 250 to indicate when a ballot is being outputted by output port 126*b*. Cameras 160*a* and 160*b* image the upwardly and downwardly facing surfaces, respectively, of the ballot in response to the signal from sensor 272. In this way, the ballot is scanned in response to it being printed. It should be noted that, in some embodiments, cameras 160*a* and 160*b* are bar code scanners which scan a bar code printed on the upwardly and downwardly facing surfaces, respectively, of the ballot that is being outputted.

Cameras 160*a* and 160*b*, as well as sensor 272 are in communication with the computer that operates printer 125. Cameras 160*a* and 160*b* and sensor 272 can be in communication with the computer in many different ways, such as through wires or wirelessly. In this embodiment, camera 160*a* and sensor 272 are in communication with the computer through cables 271 and 273, respectively. Camera 160*b* is also in communication with the computer through a cable, but the cable cannot be seen in this view.

In accordance with the invention, acceptance tray assembly 290 includes a door 280 which is repeatably moveable between open and closed positions. Door 280 is shown in the open position in FIG. 12 and the closed position in FIG. 11. Door 280 is in the closed position in response to an indication that the ballot being outputted through output port 126*b* is a good ballot. For example, the ballot is a good ballot when the indicia printed on its downwardly facing surface corresponds with the indicia printed on its upwardly facing surface. The indicia printed on the upwardly and downwardly facing surfaces are determined by scanning the bar codes printed thereon with cameras 160*a* and 160*b*.

Door 280 is in the open position in response to an indication that the ballot being outputted through output port 126*b* is a bad ballot. For example, the ballot is a bad ballot when the indicia printed on its downwardly facing surface does not correspond with the indicia printed on its upwardly facing surface. When door 280 is in the open position, the bad ballot is diverted by door 280 so it flows through opening 261 which extends through sidewall 267 (FIGS. 9 and 10). Door 280 is curved so that a ballot engaging it while it is open is diverted downwardly towards slot 261. Door 280 can have many different curvatures to divert the ballot downwardly. For example, in this embodiment, door 280 is curved so that it is concave.

The bad ballot flows through slot 261 so it is received within inner volume 260. Hence, slot 261 is sized and shaped to receive a ballot. The bad ballots that accumulate within inner volume 260 can be secured by latching latch 266 with sidewall 264 so that door 265 is restricted from being opened. After the bad ballot has been diverted through slot 261, door 280 closes to reduce the likelihood that a good ballot is unintentionally diverted through slot 261. It is desirable to not divert good ballots through slot 261 because then they need to be reprinted, which wastes time and paper.

Door 280 can be moved between the open and closed positions in many different ways. In this embodiment a motor (not shown) is included with acceptance tray assembly 290 and operatively coupled with door 280. The motor is operatively coupled with the computer that communicated with camera 160*a* and 160*b*, as well as printer 125 and sensor 272. Software which operates the computer compares the scans of the upwardly and downwardly facing surfaces of the ballot being outputted by output port 126*b* and determines whether or not they correspond. When the scans correspond, the door is in the closed position. However, when the software determines that the scans do not correspond, the computer sends an open signal to the motor and door 280 moves from the closed position to the open position in response. The computer sends a close signal to the motor in response to the printer outputting the next ballot. In this way, the next ballot is not undesirably diverted by door 280.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. An election ballot printing system, comprising:
- a printer;
- an electronic imaging device;
- a support arm which couples the electronic imaging device to the printer;
- a computer operatively coupled to the printer and electronic imaging device, wherein the electronic imaging device images a ballot outputted by the printer in response to an indication provided by the computer.

2. The system of claim 1, further including a ballot support tray which receives the ballot, the ballot support tray being angled downwardly away from the printer.

3. The system of claim 1, further including a ballot support tray which includes an acceptance tray housing and ballot support structure, the acceptance tray housing being repeatably moveable along the ballot support structure.

4. The system of claim 3, wherein the ballot support structure includes an opening which faces a downwardly facing surface of a ballot carried by the ballot support structure.

5. The system of claim 1, wherein the electronic imaging device flows information corresponding to the ballot to the computer.

6. The system of claim 5, wherein the information includes first and second indicia information.

7. The system of claim 6, wherein the computer compares the first and second indicia information to each other.

8. The system of claim 1, further including a turn-down bar which engages the ballot in response to the ballot being outputted by the printer.

9. An election ballot printing system, comprising:
- a printer;
- an electronic imaging device directed at an output of the printer, wherein the electronic imaging device receives information corresponding to a ballot outputted by the printer; and
- a ballot support tray which receives the ballot outputted by the printer.

10. The system of claim 9, wherein the electronic imaging device images the ballot outputted by the printer in response to an indication that the ballot is being printed.

11. The system of claim 9, further including a computer operatively coupled to the electronic imaging device, wherein the electronic imaging device receives the information in response to an indication from the computer.

12. The system of claim 11, wherein the computer stores information provided by the electronic imaging device, wherein the information corresponds with the ballot outputted by the printer.

13. The system of claim 9, wherein the ballot support tray includes an end plate, and opposed guide rails which guide the ballot to the end plate.

14. The system of claim 9, wherein the ballot support tray includes an acceptance tray housing which is repeatably moveable between positions towards and away from the electronic imaging device.

15. The system of claim 9, further including a support arm which couples the electronic imaging device to the computer.

16. The system of claim 9, wherein the electronic imaging device is a bar code reader.

17. The system of claim 9, wherein the electronic imaging device is a video camera.

18. The system of claim 9, wherein the electronic imaging device images opposed sides of the ballot outputted by the printer in response to an indication that the ballot is being printed.

19. The system of claim 9, wherein the information includes first and second indicia information positioned on opposed sides of the ballot.

20. The system of claim 19, wherein the computer compares the first and second indicia information to each other.

21. A method of providing a ballot, comprising:

providing an election ballot printing system which includes a computer operatively coupled to a printer and electronic imaging device;

providing an indication to the printer from the computer, wherein the indication corresponds to the desirability to print a ballot;

imaging the ballot with the electronic imaging device in response to a control signal from the computer; and storing indicia information provided by the electronic imaging device, the indicia information corresponding with the ballot outputted by the printer.

22. The method of claim 21, wherein the ballot is imaged in response to an indication that the ballot is being printed.

23. The method of claim 21, further including flowing the image between the computer and electronic imaging device.

24. The method of claim 21, further including receiving the ballot outputted by the printer with a ballot support tray.

25. The method of claim 24, further including adjusting the position of an acceptance tray housing of the ballot support tray relative to the electronic imaging device.

26. The method of claim 24, further including removing a ballot from the ballot support tray by engaging the ballot through an opening that faces a downwardly facing surface of the ballot.

27. The method of claim 21, further including engaging the ballot outputted by the printer with a turn-down bar.

28. An election ballot printing system, comprising:

a printer;

an electronic imaging device;

a computer operatively coupled to the printer and electronic imaging device, wherein the electronic imaging device images a ballot outputted by the printer in response to an indication provided by the computer; and a turn-down bar which engages the ballot in response to the ballot being outputted by the printer.

29. A method of providing a ballot, comprising:

providing an election ballot printing system which includes a computer operatively coupled to a printer and electronic imaging device;

providing an indication to the printer from the computer, wherein the indication corresponds to the desirability to print a ballot;

imaging the ballot with the electronic imaging device in response to a control signal from the computer;

engaging the ballot outputted by the printer with a turn-down bar; and storing information provided by the electronic imaging device, the information corresponding with the ballot outputted by the printer.

* * * * *